US012658427B2

(12) United States Patent
Bie et al.

(10) Patent No.: US 12,658,427 B2
(45) Date of Patent: Jun. 16, 2026

(54) POSITIVE ELECTRODE ACTIVE MATERIAL, POSITIVE ELECTRODE PLATE, SECONDARY BATTERY, AND POWER CONSUMING APPARATUS

(71) Applicant: CONTEMPORARY AMPEREX TECHNOLOGY CO., LIMITED, Ningde (CN)

(72) Inventors: Changfeng Bie, Ningde (CN); Ming Xu, Ningde (CN); Xiaojing Li, Ningde (CN); Siyuan He, Ningde (CN); Shengkun Xie, Ningde (CN); Mianyu Xie, Ningde (CN); Huan Ni, Ningde (CN); Hu Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/303,577

(22) Filed: Aug. 19, 2025

(65) Prior Publication Data

US 2025/0372621 A1 Dec. 4, 2025

Related U.S. Application Data

(63) Continuation of application No. PCT/CN2024/088289, filed on Apr. 17, 2024.

(30) Foreign Application Priority Data

Aug. 23, 2023 (CN) .......................... 202311070156.2

(51) Int. Cl.
H01M 4/36 (2006.01)
H01M 4/58 (2010.01)
(Continued)

(52) U.S. Cl.
CPC .......... *H01M 4/364* (2013.01); *H01M 4/362* (2013.01); *H01M 4/366* (2013.01);
(Continued)

(58) Field of Classification Search
CPC ...... H01M 4/364; H01M 4/362; H01M 4/366; H01M 4/5825; H01M 50/434; H01M 50/446; H01M 50/457; H01M 2220/20
See application file for complete search history.

(56) References Cited

U.S. PATENT DOCUMENTS

2023/0108289 A1    4/2023    Bie et al.
2023/0268498 A1*   8/2023    Zhang ................... H01M 4/364
                                                               429/231.95

FOREIGN PATENT DOCUMENTS

CN        02612487    A      7/2012
CN        110582875   A      12/2019
(Continued)

OTHER PUBLICATIONS

ISR for PCT/CN2024/088289 mailed Jun. 28, 2024.
Extended European Search Report dated Apr. 30, 2026 for European Appl. No. 24855317.4.

*Primary Examiner* — Eugenia Wang
(74) *Attorney, Agent, or Firm* — LADAS & PARRY LLP

(57) ABSTRACT

A positive electrode active material, a positive electrode plate, a secondary battery, and a power consuming apparatus are provided. The positive electrode active material includes (i) secondary particles and (ii) single-crystal or quasi-single-crystal particles. The secondary particles are mainly formed by aggregating primary particles and the secondary particles further include an M1 element. The M1 element includes a transition metal element other than iron. A mass content of the M1 element is X1 based on a total mass of the secondary particles, where $500 \text{ ppm} \leq X1 \leq 5000 \text{ ppm}$, and optionally, $800 \text{ ppm} \leq X1 \leq 2000 \text{ ppm}$. The single-crystal or quasi-single-
(Continued)

1 μm crystal particles include an Ma element. The Ma element includes a transition metal element other than iron. A mass content of the Ma element is X2 based on a total mass of the single-crystal or quasi-single-crystal particles, where X2 is less than X1.

17 Claims, 3 Drawing Sheets

(51) Int. Cl.
    *H01M 50/434*     (2021.01)
    *H01M 50/446*     (2021.01)
    *H01M 50/457*     (2021.01)

(52) U.S. Cl.
    CPC ....... *H01M 4/5825* (2013.01); *H01M 50/434* (2021.01); *H01M 50/446* (2021.01); *H01M 50/457* (2021.01); *H01M 2220/20* (2013.01)

(56)            References Cited

FOREIGN PATENT DOCUMENTS

| | | | |
|---|---|---|---|
| CN | 111640912 A | 9/2020 |
| CN | 112151794 A | 12/2020 |
| CN | 115461895 A | 12/2022 |
| CN | 116097468 A | 5/2023 |
| CN | 116601794 A | 8/2023 |
| JP | 2015122298 A | 7/2015 |

\* cited by examiner

62

61

5 µm

63

64

62

1 µm

POSITIVE ELECTRODE ACTIVE MATERIAL, POSITIVE ELECTRODE PLATE, SECONDARY BATTERY, AND POWER CONSUMING APPARATUS

CROSS-REFERENCE TO RELATED APPLICATIONS

The present application is a continuation of International application PCT/CN2024/088289 filed on Apr. 17, 2024 that claims priority to Chinese Patent Application No. 202311070156.2, filed on Aug. 23, 2023 The content of these applications is incorporated herein by reference in its entirety.

TECHNICAL FIELD

The present invention belongs to the technical field of secondary batteries, and specifically, to a positive electrode active material, a positive electrode plate, a secondary battery, and a power consuming apparatus.

BACKGROUND

In recent years, with the wide use of secondary batteries in energy storage power systems such as hydroelectric, thermal, wind, and solar power stations, and in a plurality of fields such as electric tools, electric bicycles, electric motorcycles, electric vehicles, military equipment, and aerospace, an increasingly stricter requirement is raised for costs and performance of secondary batteries in the market.

In the existing technology, it is usually difficult to achieve a balance between the costs and the performance of the secondary batteries. How to achieve a balance between reducing the costs of the secondary batteries and ensuring electrochemical performance of the secondary batteries becomes a problem that needs to be urgently resolved.

SUMMARY

In view of the problem in the background, the present application provides a positive electrode active material, a positive electrode plate, a secondary battery, and a power consuming apparatus, to enable the secondary battery to have both low costs and high performance.

To achieve the foregoing objective, the present invention provides the following technical solutions.

According to a first aspect of the present application, a positive electrode active material is provided. The positive electrode active material includes (i) secondary particles and (ii) single-crystal or quasi-single-crystal particles. The secondary particles are mainly formed by aggregating primary particles and the secondary particles further include an M1 element. The M1 element includes a transition metal element other than iron. A mass content of the M1 element is X1 based on a total mass of the secondary particles, where $500 \text{ ppm} \leq X1 \leq 5000 \text{ ppm}$, and optionally, $800 \text{ ppm} \leq X1 \leq 2000 \text{ ppm}$. The single-crystal or quasi-single-crystal particles include an Ma element. The Ma element includes a transition metal element other than iron. A mass content of the Ma element is X2 based on a total mass of the single-crystal or quasi-single-crystal particles, where X2 is less than X1.

To prepare a low-cost positive electrode active material, a low-cost raw material needs to be used. When a by-product recycled by a steel factory or a product obtained by recycling a positive electrode material is used as an iron source to prepare a positive electrode active material, such as lithium iron phosphate, costs of the positive electrode active material can be significantly reduced. However, the by-product recycled by the steel factory usually includes another transition metal impurity, such as nickel, cobalt, or chromium. Lithium-deduction costs of the secondary particles including the M1 element whose mass content ranges from 500 ppm to 5000 ppm are only 60% to 70% of costs of a commercial positive electrode active material in the existing technology.

Existence of the impurity in the positive electrode active material reduces a capacity of the positive electrode active material. Shaping the low-cost positive electrode active material into the secondary particles that are formed by aggregating the primary particles with a small particle size helps improve kinetic performance of the secondary battery, thereby improving a capacity level of the secondary battery, to compensate for a decrease in the capacity of the secondary battery caused by the impurity. However, the secondary particles have a large quantity of grain boundaries. The transition metal impurity is easily dissolved in a cyclic process, migrates to a negative electrode, and is reduced at the negative electrode. As a result, a self-discharging phenomenon of the battery is aggravated. The single-crystal or quasi-single-crystal particles with a small impurity content have higher structural stability and cycle stability, and can reduce dissolution of the transition metal impurity. In addition, coordination between the single-crystal or quasi-single-crystal particles and the secondary particles increases a length and a sinuosity of a migration path of the transition metal impurity, reduces an amount of transition metal deposited at the negative electrode, improves uniformity of the transition metal deposited at the negative electrode, reduces a probability that transition metal ions are directly deposited at the negative electrode and a dendrite is generated, and relieves the self-discharging phenomenon of the battery.

In any implementation, the single-crystal or quasi-single-crystal particles include the Ma element. The Ma element includes the transition metal element other than iron. The mass content X2 of the Ma element ranges from 20 ppm to 450 ppm, and optionally, ranges from 100 ppm to 300 ppm, based on the total mass of the single-crystal or quasi-single-crystal particles.

The single-crystal or quasi-single-crystal particles in the foregoing range of the mass content can further suppress precipitation of the transition metal element from a positive electrode, reduce the self-discharging phenomenon of the battery, and improve cycle stability of the battery. The mass content X2 of the Ma element ranges from 100 ppm to 300 ppm based on the total mass of the single-crystal or quasi-single-crystal particles, so that a balance between low costs and good cycle stability of the battery can be further achieved.

In any implementation, the secondary particles further include an M2 element. The M2 element includes at least one of an alkali metal element other than a lithium element, an alkaline earth metal element, and a boron group element. A mass content of the M2 element ranges from 50 ppm to 8000 ppm, and optionally, ranges from 1000 ppm to 5000 ppm, based on the total mass of the secondary particles.

When industrial-grade lithium carbonate, quasi battery-grade lithium carbonate extracted from a salt lake, and agriculture-grade phosphoric acid are used as a lithium source and a phosphorus source to prepare the positive electrode active material, such as lithium-containing phosphate, the costs of the positive electrode active material can be further reduced. However, the industrial-grade lithium carbonate and the agriculture-grade phosphoric acid usually include the alkali metal element other than the lithium element, the alkaline earth metal element, and the boron group element that have a high content. Costs of the secondary particles including the M2 element whose mass content ranges from 650 ppm to 8000 ppm are further reduced, so that the costs of the battery are further reduced.

Existence of the alkali metal element other than the lithium element, the alkaline earth metal element, and the boron group element that have the high content in the positive electrode active material blocks a transmission channel of active ions, further deteriorates kinetic performance and a gram capacity of the positive electrode active material, and reduces a gram capacity of the secondary battery. The positive electrode active material including the M2 element whose mass content ranges from 1000 ppm to 5000 ppm based on the total mass of the secondary particles can further achieve a balance between the costs and a large gram capacity of the secondary battery.

In any implementation, the single-crystal or quasi-single-crystal particles further include an Mb element. The Mb element includes at least one of an alkali metal element other than a lithium element, an alkaline earth metal element, and a boron group element. A mass content of the Mb element ranges from 20 ppm to 550 ppm, and optionally, ranges from 100 ppm to 300 ppm, based on the total mass of the single-crystal or quasi-single-crystal particles.

The single-crystal or quasi-single-crystal particles in the foregoing range of the mass content can improve the capacity of the battery. The mass content of the Mb element ranges from 100 ppm to 300 ppm based on the total mass of the single-crystal or quasi-single-crystal particles, so that a balance between low costs and a large gram capacity of the battery can be further achieved.

In any implementation, an average particle size of the secondary particles is r, an average particle size of the single-crystal or quasi-single-crystal particles is R2, and $2 \leq r/R2 \leq 30$, and optionally, $4 \leq r/R2 \leq 10$.

A size of the secondary particles matches a size of the single-crystal or quasi-single-crystal particles, so that a compaction density of an electrode plate can be improved, cracking of the positive electrode active material during rolling and use is reduced, and cycle performance of the secondary battery is improved. The positive electrode active material of $4 \leq r/R2 \leq 10$ can further improve a compaction density and the cycle performance of the battery.

In any implementation, an average particle size of the primary particles is R1, the average particle size of the single-crystal or quasi-single-crystal particles is R2, and $2 \leq R2/R1 \leq 20$, and optionally, $6 \leq R2/R1 \leq 10$.

In the positive electrode active material, a size of the primary particles of the secondary particles matches a size of single-crystal primary particles, to balance the kinetic performance and the cycle stability. The positive electrode active material of $6 \leq R2/R1 \leq 10$ can further achieve a balance between the kinetic performance and the cycle stability of the battery.

In any implementation, the average particle size r of the secondary particles ranges from 1.2 μm to 18 μm, and optionally, ranges from 2.4 μm to 6 μm.

When the average particle size of the secondary particles is within this range, the compaction density of the electrode plate can be effectively improved, and the cracking of the positive electrode active material during rolling and use is reduced. Because the average particle size of the secondary particles is large, a dissolution rate of the M1 element can be reduced, thereby improving the cycle performance of the secondary battery. The average particle size r of the secondary particles ranges from 2.4 μm to 6 μm, so that the compaction density and the cycle performance of the battery can be further improved, and the secondary particles can more effectively match the single-crystal or quasi-single-crystal particles.

In any implementation, the average particle size R1 of the primary particles ranges from 30 nm to 300 nm, and optionally, ranges from 60 nm to 100 nm.

The average particle size of the primary particles being within this range helps improve the compaction density of the low-cost electrode plate, and improve the gram capacity of the secondary battery. When the average particle size R1 of the primary particles ranges from 60 nm to 100 nm, both an impact of the impurity in the secondary particles on the gram capacity and an impact of the impurity and the single-crystal or quasi-single-crystal particles on the kinetic performance of the secondary battery can be reduced, and the kinetic performance of the secondary battery is improved. The primary particles are designed to be at a nanometer-level, so that impacts of the impurity in the positive electrode active material on a battery rate, low-temperature performance, and the capacity can be reduced.

In any implementation, a mass ratio of the secondary particles to the single-crystal or quasi-single-crystal particles ranges from 1:9 to 4:6, and optionally, ranges from 2:8 to 3:7.

Blending of the single-crystal or quasi-single-crystal particles and the secondary particles can reduce an ion dissolution effect of the secondary particles, and balance the gram capacity and the cycle stability of the secondary battery.

The positive electrode active material within the foregoing range can achieve a balance between low costs and good electrochemical performance of the secondary battery.

In any implementation, the M2 element and the Mb element each independently include at least one of Na, K, Ca, Al, and Mg, and the M1 element and the Ma element each independently include at least one of Ni, Cu, Zn, Mn, Cr, and Co.

In any implementation, the positive electrode active material includes lithium-containing phosphate, and optionally, the positive electrode active material includes lithium iron phosphate and a coating modification material thereof.

According to a second aspect of the present application, a positive electrode plate is provided, including a positive electrode film layer. The positive electrode film layer includes the positive electrode active material in any implementation.

The positive electrode plate has low costs and a high compaction density.

According to a third aspect of the present application, a secondary battery is provided, including the positive electrode active material in any implementation and the positive electrode plate in any implementation.

The secondary battery has low costs and high cycle stability.

In any implementation, the secondary battery further includes a separator, and the separator includes at least one of a hydroxyl functional group, an amino functional group, a carboxyl functional group, and an ester functional group.

In any implementation, the separator includes a base layer and a functional coating located on at least one side of the base layer, and the functional coating includes an inorganic material.

In any implementation, the inorganic material includes at least one of aluminum oxide, silicon dioxide, magnesium oxide, calcium oxide, and titanium oxide, and a surface of the inorganic material includes at least one of —OH, —NH$_2$, and —COOH.

When the transition metal ions dissolved in the positive electrode active material diffuse from the positive electrode to the negative electrode, the separator can chelate or absorb the transition metal ions by using a functional group on a surface of the separator, to form a stable metal chelation or adsorptive, so that the transition metal ions are effectively prevented from migrating to the negative electrode, a damage caused by the transition metal ions to a solid electrolyte interface film (SEI film) on a surface of the negative electrode is reduced, and reduction of the transition metal ions to a metal elementary substance at the negative electrode is also effectively reduced, thereby helping improve a capacity retention rate of the secondary battery.

According to a fourth aspect of the present application, a power consuming apparatus is included, including the secondary battery in any implementation.

REFERENCE NUMERALS

Figure 1:
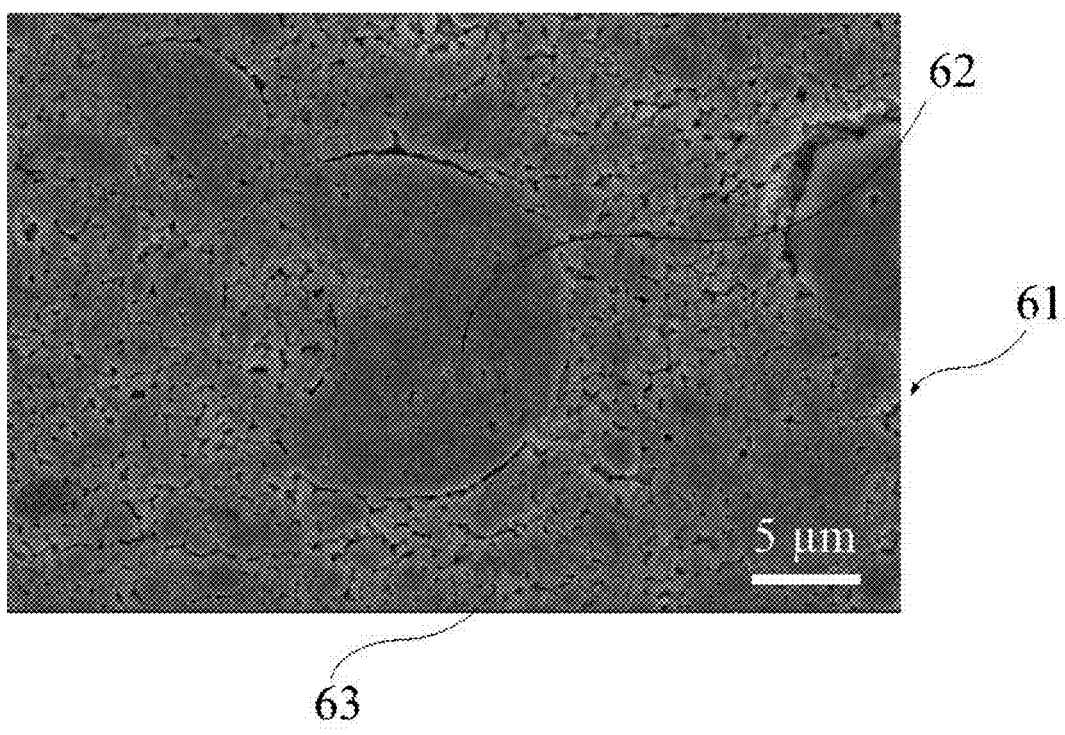
FIG. 1 is a scanning electron microscope diagram of a cross section of a positive electrode plate according to an implementation of the present application.

5. secondary battery; 51. housing; 52. electrode assembly; 53. cover plate; 6. positive electrode plate; 61. positive electrode film layer; 62. secondary particle; 63. single-crystal or quasi-single-crystal particle; 64. primary particle; and 65. positive electrode current collector.

DETAILED DESCRIPTION

Hereinafter, implementations that specifically disclose a positive electrode active material, a secondary battery, and a power consuming apparatus of the present application are described in detail with reference to the accompanying drawings as appropriate. However, there are cases in which unnecessary detailed descriptions are omitted. For example, there are cases in which detailed explanations of well-known matters and repeated explanations of actually the same structure are omitted. Thus, the following descriptions do not become unnecessarily lengthy, which facilitates understanding by those skilled in the art. In addition, the accompanying drawings and subsequent descriptions are provided for those skilled in the art to fully understand the present application, and are not intended to limit the subject matter recited in the claims.

A "range" disclosed in the present application is defined in a form of a lower limit and an upper limit. A given range is defined by selecting a lower limit and an upper limit, and the selected lower limit and upper limit define a boundary of the specific range. The range defined in this manner may include or exclude end values, and may be arbitrarily combined, that is, any lower limit can be combined with any upper limit to form a range. For example, if ranges of 60 to 120 and 80 to 110 are listed for a particular parameter, it is to be understood that ranges of 60 to 110 and 80 to 120 are also expected. In addition, if the minimum range values 1 and 2 and the maximum range values 3, 4 and 5 are listed, the following ranges are all contemplated: 1 to 3, 1 to 4, 1 to 5, 2 to 3, 2 to 4 and 2 to 5. In the present application, unless stated otherwise, the numerical range "a to b" represents an abbreviated representation of any combination of real numbers between a to b, where both a and b are real numbers. For example, the numerical range "0 to 5" means that all real numbers between 0 and 5 are listed herein, and "0 to 5" is merely an abbreviated representation of the combination of these numbers. In addition, when a parameter is expressed as an integer >2, it is equivalent to disclosing that the parameter is, for example, an integer of 2, 3, 4, 5, 6, 7, 8, 9, 10, 11, 12, or the like.

Unless otherwise specified, all the implementations and optional implementations of the present application can be combined with each other form new technical solutions.

Unless otherwise specified, all technical features and optional technical features of the present application can be combined with each other to form new technical solutions.

Unless otherwise specified, all the steps in the present application can be performed in the order described or in a random order, and preferably in the order described. For example, a method includes steps (a) and (b), meaning that the method may include steps (a) and (b) performed sequentially, or may include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), or the like.

Unless otherwise specified, the terms "include" and "comprise" mentioned in the present application indicate open inclusion or closed inclusion. For example, "include" and "comprise" may indicate that it is possible to include or comprise other components not listed, and it is also possible to include or comprise the listed components exclusively.

Unless otherwise specified, in the present application, the term "or" is inclusive. For example, a phrase "A or B" means "A, B, or both A and B" More specifically, any one of the following conditions satisfies the condition "A or B": A is true (or present) and B is false (or not present); A is false (or not present) and B is true (or present); or both A and B are true (or present).

Due to advantages such as a high energy density, a high voltage, and a long service life, lithium secondary batteries are widely used in front-end technical fields such as digital technologies and electric vehicles. A lithium iron phosphate material is a common positive electrode active material of the lithium secondary battery. When a lithium iron phosphate particle material with a high purity and a small quantity of impurities is used in the secondary battery, battery costs are high, and consequently, it is difficult to reduce a sale price of a power consuming apparatus. When the positive electrode active material is prepared by using a low-cost raw material, such as industrial-grade lithium carbonate, agriculture-grade phosphoric acid, secondary-recycled iron(III)phosphate, or a by-product recycled by a steel factory, raw-material costs of the secondary battery can be significantly reduced. However, the secondary battery prepared by using the low-cost raw material has low electrochemical performance, and it is difficult to satisfy a use requirement.

Positive Electrode Active Material

Based on this, the present application provides a positive electrode active material. The positive electrode active material includes (i) secondary particles and (ii) single-crystal or quasi-single-crystal particles. The secondary particles are mainly formed by aggregating primary particles and the secondary particles further include an M1 element. The M1 element includes a transition metal element other than iron. A mass content of the M1 element is X1 based on a total mass of the secondary particles, where 500 ppm≤X1≤5000 ppm. In some implementations, 800 ppm≤X1≤2000 ppm based on the total mass of the secondary particles. The single-crystal or quasi-single-crystal particles include an Ma element. The Ma element includes a transition metal element other than iron. A mass content of the Ma element is X2 based on a total mass of the single-crystal or quasi-single-crystal particles, where X2 is less than X1.

In this specification, the secondary particle refers to an agglomeration formed by aggregating not less than five primary particles.

In this specification, the single-crystal or quasi-single-crystal particle refers to an agglomeration formed by aggregating primary particles that are not aggregated or less than five primary particles.

In this specification, ppm refers to parts per million.

In this specification, the transition metal element is a series of elements in a d-block in the periodic table.

In some implementations, the M1 element includes at least one of Ni, Cu, Zn, Mn, Cr, and Co.

In some implementations, the mass content X1 of the M1 elements is 500 ppm, 600 ppm, 700 ppm, 800 ppm, 900 ppm, 1000 ppm, 1500 ppm, 2000 ppm, 2500 ppm, 3000 ppm, 3500 ppm, 4000 ppm, 4500 ppm, 5000 ppm, or any value between the two values based on the total mass of the secondary particles.

In some implementations, a difference between X1 and X2 ranges from 50 ppm to 4980 ppm.

In some implementations, the difference between X1 and X2 is optionally 50 ppm, 100 ppm, 200 ppm, 300 ppm, 400 ppm, 480 ppm, 700 ppm, 1450 ppm, 1550 ppm, 1700 ppm, 1900 ppm, 1980 ppm, 2500 ppm, 3000 ppm, 3500 ppm, 4000 ppm, 4500 m, 4900 ppm, or 4980 ppm.

Figure 2:
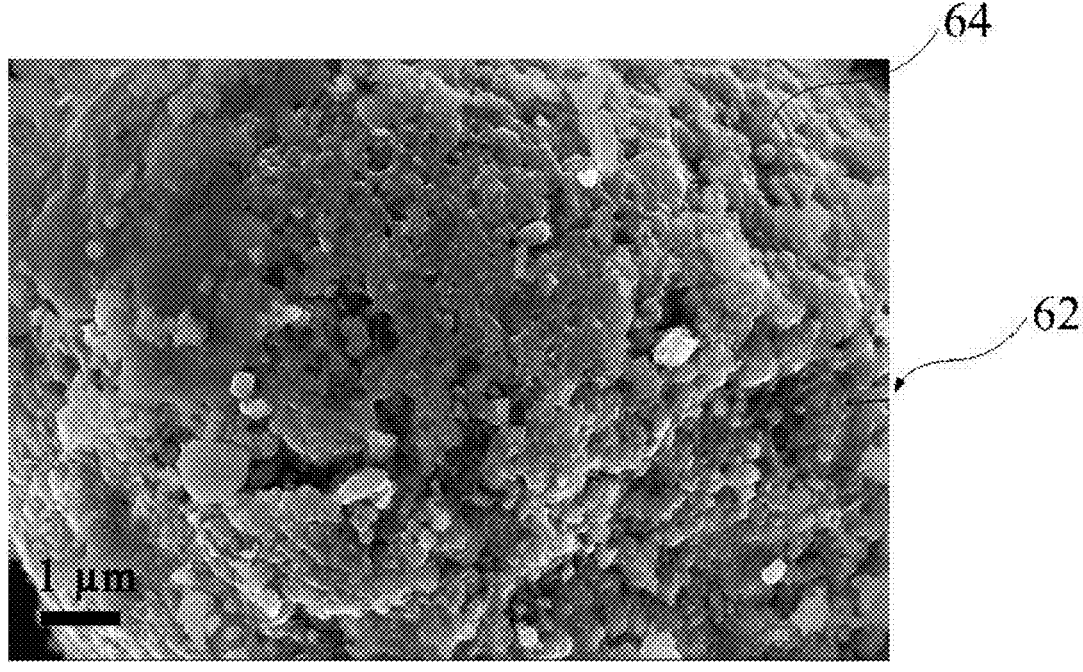
FIG. 2 is a scanning electron microscope diagram of a cross section of a secondary particle according to an implementation of the present application.
Figure 3:
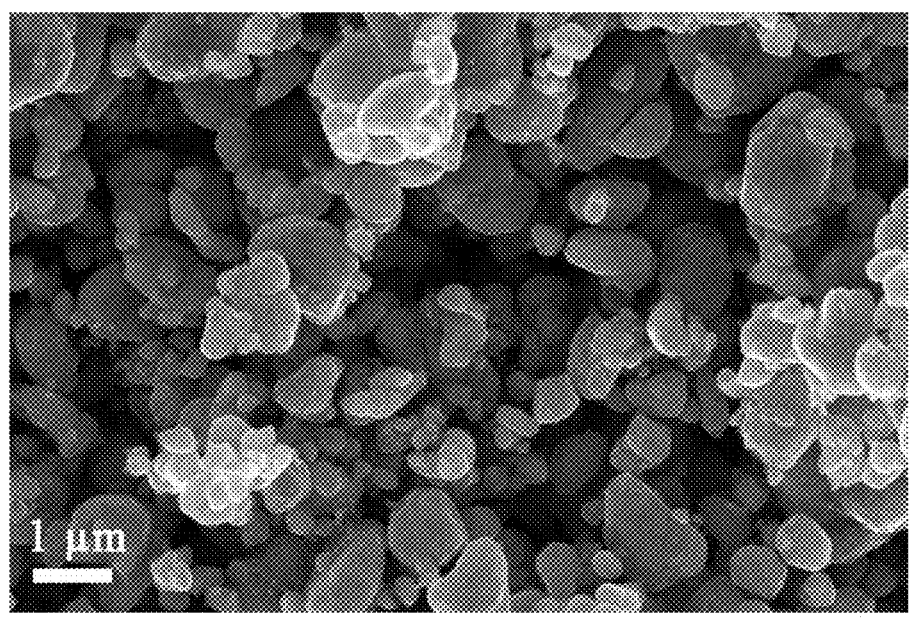
FIG. 3 is a scanning electron microscope diagram of a cross section of a single-crystal or quasi-single-crystal particle according to an implementation of the present application.

A morphology of the positive electrode active material may be tested by using any known method in the art. In an example, a cross section of a positive electrode plate may be observed by using a scanning electron microscope, to observe the morphology of the positive electrode active material. FIG. 1 is a diagram of a cross-sectional morphology of a positive electrode plate according to any embodiment of the present application. It can be learned from FIG. 1 that a positive electrode film layer 61 includes secondary particles 62 and single-crystal or quasi-single-crystal particles 63. A morphology of the secondary particles 62 is shown in FIG. 2. The secondary particle 62 with a large particle size refers to an agglomeration formed by aggregating primary particles 64 with a small particle size. A morphology of the single-crystal or quasi-single-crystal particles 63 is shown in FIG. 3. A size of the single-crystal or quasi-single-crystal particles 63 is greater than that of the primary particles 64 of the secondary particles, and is less than that of the secondary particles 62. The size of the secondary particles 62 and the size of the single-crystal or quasi-single-crystal particles 63 are respectively obtained through statistics collection, and sieving is performed based on the different particle sizes of the two particles. Alternatively, after the secondary particles 62 and the single-crystal or quasi-single-crystal particles 63 are separated based on different speeds at which the secondary particles 62 and the single-crystal or quasi-single-crystal particles 63 subside in mixed liquid of alcohol and water, a mass content of a particle element is tested and analyzed by using inductively coupled plasma.

To prepare a low-cost positive electrode active material, a low-cost raw material needs to be used. When a by-product recycled by a steel factory or a recycled material of a battery is used to prepare a positive electrode active material, such as lithium iron phosphate, costs of the positive electrode active material can be significantly reduced. However, the by-product recycled by the steel factory or the recycled material of the battery usually includes another transition metal impurity, such as nickel, cobalt, or chromium. Costs of the secondary particles including the M1 element whose mass content ranges from 500 ppm to 5000 ppm are only 60% to 70% of costs of a commercial positive electrode active material in the existing technology.

Existence of the impurity in the positive electrode active material reduces a capacity of the positive electrode active material. Shaping the low-cost positive electrode active material into the secondary particles that are formed by aggregating the primary particles with a small particle size helps improve kinetic performance of the secondary battery, thereby improving a capacity level of the secondary battery, to compensate for a decrease in the capacity of the secondary battery caused by the impurity. However, the secondary particles have a large quantity of grain boundaries. The transition metal impurity is easily dissolved in a cyclic process, migrates to a negative electrode, and is reduced at the negative electrode. As a result, a self-discharging phenomenon of the battery is aggravated, resulting in a large decay of a cycle capacity retention rate of the battery. The single-crystal or quasi-single-crystal particles with a small impurity content have higher structural stability and cycle stability, and can reduce dissolution of the transition metal impurity. In addition, coordination between the single-crystal or quasi-single-crystal particles and the secondary particles increases a length and a sinuosity of a migration path of the transition metal impurity, reduces an amount of transition metal deposited at the negative electrode, improves uniformity of the transition metal deposited at the negative electrode, and relieves the self-discharging phenomenon of the battery.

The positive electrode active material including the M1 element whose mass content X1 ranges from 400 ppm to 2000 ppm based on the total mass of the secondary particles can further achieve a balance between low costs and good cycle stability of the battery.

In some implementations, the single-crystal or quasi-single-crystal particles include the Ma element. The Ma element includes the transition metal element other than iron. The mass content X2 of the Ma element ranges from 20 ppm to 450 ppm based on the total mass of the single-crystal or quasi-single-crystal particles. In some implementations, the mass content X2 of the Ma element ranges from 100 ppm to 300 ppm based on the total mass of the single-crystal or quasi-single-crystal particles.

In some implementations, the single-crystal or quasi-single-crystal particles include the Ma element. The Ma element includes the transition metal element other than iron. The mass content X2 of the Ma element is optionally 20 ppm, 50 ppm, 100 ppm, 150 ppm, 200 ppm, 250 ppm, 300 ppm, 350 ppm, 400 ppm, 450 ppm, or any value between the two values based on the total mass of the single-crystal or quasi-single-crystal particles.

The single-crystal or quasi-single-crystal particles in the foregoing range of the mass content can further suppress precipitation of the transition metal element from a positive electrode, reduce the self-discharging phenomenon of the battery, and improve cycle stability of the battery. The mass content X2 of the Ma element ranges from 100 ppm to 300 ppm based on the total mass of the single-crystal or quasi-single-crystal particles, so that a balance between low costs and good cycle stability of the battery can be further achieved.

In some implementations, the secondary particles further include an M2 element. The M2 element includes at least one of an alkali metal element other than a lithium element, an alkaline earth metal element, and a boron group element. A mass content of the M2 element ranges from 650 ppm to 8000 ppm based on the total mass of the secondary particles. In some implementations, the mass content of the M2 element ranges from 1000 ppm to 5000 ppm based on the total mass of the secondary particles.

In this specification, the alkali metal element refers to six metal elements except hydrogen (H) in the group IA in the periodic table, to be specific, lithium (Li), sodium (Na), potassium (K), rubidium (Rb), cesium (CS), and francium (Fr).

In this specification, the alkaline earth metal element refers to elements in the group IIA in the periodic table, and includes six elements, to be specific, beryllium (Be), magnesium (Mg), calcium (Ca), strontium (Sr), barium (Ba), and radium (Ra).

In this specification, the boron group element refers to elements in the group IIIA in the periodic table, and includes six elements, to be specific, boron (B), aluminum (Al), gallium (Ga), indium (In), thallium (TI), and nihonium (Nh).

In some implementations, the M2 element includes at least one of Na, K, Ca, Al, and Mg.

In some implementations, the mass content of the M2 element is 650 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, or any value between the two values based on the total mass of the secondary particles.

When a product obtained by recycling a positive electrode material, such as iron(III) phosphate, industrial-grade lithium carbonate, quasi battery-grade lithium carbonate extracted from a salt lake, and agriculture-grade phosphoric acid are used as a lithium source and a phosphorus source to prepare the positive electrode active material, such as lithium-containing phosphate, the costs of the positive electrode active material can be further reduced. However, the recycled product, the industrial-grade lithium carbonate and the agriculture-grade phosphoric acid usually include the alkali metal element, the alkaline earth metal element, and the boron group element that have a high content. Costs of the secondary particles including the M2 element whose mass content ranges from 1000 ppm to 8000 ppm are further reduced, so that the costs of the battery are further reduced.

Existence of the alkali metal element other than the lithium element, the alkaline earth metal element, and the boron group element that have the high content in the positive electrode active material blocks a transmission channel of active ions, further deteriorates kinetic performance and a gram capacity of the positive electrode active material, and reduces a gram capacity of the secondary battery. The positive electrode active material including the M2 element whose mass content ranges from 1000 ppm to 5000 ppm based on the total mass of the secondary particles can further achieve a balance between the costs and a large gram capacity of the secondary battery.

In some implementations, the single-crystal or quasi-single-crystal particles further include an Mb element. The Mb element includes at least one of an alkali metal element other than a lithium element, an alkaline earth metal element, and a boron group element. A mass content of the Mb element ranges from 20 ppm to 500 ppm based on the total mass of the single-crystal or quasi-single-crystal particles. In some implementations, the mass content of the Mb element ranges from 100 ppm to 300 ppm based on the total mass of the single-crystal or quasi-single-crystal particles.

In some implementations, the mass content of the Mb element is optionally 20 ppm, 50 ppm, 100 ppm, 150 ppm, 200 ppm, 250 ppm, 300 ppm, 350 ppm, 400 ppm, 450 ppm, 500 ppm, or any value between the two values based on the total mass of the single-crystal or quasi-single-crystal particles.

The single-crystal or quasi-single-crystal particles in the foregoing range of the mass content can improve the capacity of the battery. The mass content of the Mb element ranges from 100 ppm to 300 ppm based on the total mass of the single-crystal or quasi-single-crystal particles, so that a balance between low costs and a large gram capacity of the battery can be further achieved.

In some implementations, an average particle size of the secondary particles is r, an average particle size of the single-crystal or quasi-single-crystal particles is R2, and $2 \leq r/R2 \leq 30$. In some implementations, $4 \leq r/R2 \leq 10$.

The average particle size of the secondary particles and the average particle size of the single-crystal or quasi-single-crystal particles may be obtained through testing by using any known method in the art. In an example, the average particle size of the secondary particles and the average particle size of the single-crystal or quasi-single-crystal particles may be tested by using a scanning electron microscope method. A cross section of a positive electrode plate is observed by using a scanning electron microscope, observing is performed by using the scanning electron microscope, particle size area analysis is performed on an obtained scanning electron microscope diagram of the cross section of the electrode plate by using Avizo 3D software, a particle size of the positive electrode active material is obtained through fitting calculation, a total value of collected particle sizes of the secondary particles is divided by a total quantity of the secondary particles as the average particle size r of the secondary particles, and a total value of collected particle sizes of the single-crystal or quasi-single-crystal particles is divided by a total quantity of the single-crystal or quasi-single-crystal particles as the average particle size R2 of the single-crystal or quasi-single-crystal particles.

In some implementations, r/R2 is optionally 2, 3, 4, 5, 6, 7, 8, 9, 10, 11, 12, 13, 14, 15, 20, 25, 30, or any value between the two values.

A size of the secondary particles matches a size of the single-crystal or quasi-single-crystal particles, so that a compaction density of an electrode plate can be improved, cracking of the positive electrode active material during rolling and use is reduced, and cycle performance of the secondary battery is improved. The positive electrode active material of $4 \leq r/R2 \leq 10$ can further improve a compaction density and the cycle performance of the battery.

In some implementations, an average particle size of the primary particles is R1, the average particle size of the single-crystal or quasi-single-crystal particles is R2, and $2 \leq R2/R1 \leq 20$. In some implementations, $6 \leq R2/R1 \leq 10$.

The average particle size of the primary particles may be obtained through testing by using any known method in the art. In an example, a cross section of the secondary particles may be observed by using a scanning electron microscope, to observe a particle morphology of the secondary particles, and a particle size of the primary particles inside the secondary particles is measured. A long diameter of the primary particles is used as the particle size of the primary particles, and a total value of particle sizes of the primary particles is divided by a total quantity of the primary particles as the average particle size of the primary particles.

In some implementations, the average particle size of the primary particles is R1, the average particle size of the single-crystal or quasi-single-crystal particles is R2, and R2/R1 is optionally 2, 3, 4, 5, 6, 7, 8, 9, 10, 11, 12, 13, 14, 15, 16, 17, 18, 19, 20, or any value between the two values.

In the positive electrode active material, a size of the primary particles of the secondary particles matches a size of single-crystal primary particles, to balance the kinetic performance and the cycle stability. The positive electrode active material of $6 \leq R2/R1 \leq 10$ can further achieve a balance between the kinetic performance and the cycle stability of the battery.

In some implementations, the average particle size r of the secondary particles ranges from 1.2 μm to 18 μm. In some implementations, the average particle size r of the secondary particles ranges from 2.4 μm to 6 μm.

In some implementations, the average particle size r of the secondary particles is optionally 1.2 μm, 2.4 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, or any value between the two values.

When the average particle size of the secondary particles is within this range, the compaction density of the electrode plate can be effectively improved, and the cracking of the positive electrode active material during rolling and use is reduced, thereby improving the cycle performance of the secondary battery. The average particle size r of the secondary particles ranges from 2.4 μm to 6 μm, so that the compaction density and the cycle performance of the battery can be further improved.

In some implementations, the average particle size R1 of the primary particles ranges from 30 nm to 300 nm. In some implementations, the average particle size R1 of the primary particles ranges from 60 nm to 100 nm.

In some embodiments, the average particle size R1 of the primary particles is optionally 30 nm, 50 nm, 60 nm, 100 nm, 150 nm, 200 nm, 250 nm, 300 nm, or any value between the two values.

The average particle size of the primary particles being within this range helps improve the compaction density of the low-cost electrode plate, and improve the gram capacity of the secondary battery. When the average particle size R1 of the primary particles ranges from 60 nm to 100 nm, both an impact of the impurity in the secondary particles on the gram capacity and an impact of the impurity and the single-crystal or quasi-single-crystal particles on the kinetic performance of the secondary battery can be reduced, and the kinetic performance of the secondary battery is improved.

In some implementations, a mass ratio of the secondary particles to the single-crystal or quasi-single-crystal particles ranges from 1:9 to 4:6. In some implementations, the mass ratio of the secondary particles to the single-crystal or quasi-single-crystal particles ranges from 2:8 to 3:7.

In some implementations, the mass ratio of the secondary particles to the single-crystal or quasi-single-crystal particles is optionally 1:9, 4:6, 2:8, 3:7, or any value between the two values.

The positive electrode active material within the foregoing range can achieve a balance between low costs and good electrochemical performance of the secondary battery.

In some implementations, the M2 element and the Mb element each independently include at least one of Na, K, Ca, Al, and Mg, and the M1 element and the Ma element each independently include at least one of Ni, Cu, Zn, Mn, Cr, and Co.

In some implementations, the positive electrode active material includes lithium-containing phosphate. In some implementations, the positive electrode active material includes lithium iron phosphate and a coating modification material thereof.

In some implementations, the lithium iron phosphate includes $Li_{1+y_1}Fe_{y_2}P_{1+y_3}O_{4+y_4}$, where $0 \leq y_1 \leq 0.2$, $0.94 \leq y_2 \leq 1$, $0 \leq y_3 \leq 0.1$, and $-0.1 \leq y_4 \leq 0.1$.

It should be noted that, in this embodiment of the present application, a chemical formula of the lithium iron phosphate is a chemical formula of a material used in a preparation process. In a positive electrode plate, a battery cell, or a power consuming device, because lithium ions are consumed through processes such as formation and circulation, a measured content of lithium elements in the positive electrode active material is reduced. In addition, if lithium supplementation is performed on the positive electrode plate and a negative electrode plate, after the processes such as formation and circulation, the measured content of lithium elements in the positive electrode active material is increased. In the positive electrode plate, the battery cell, or the power consuming device, due to the processes such as formation and circulation, a person skilled in the art may understand that an element in the chemical formula of the lithium iron phosphate may be lost. For example, a phosphorus element and an oxygen element are consumed. As a result, a decrease of a content of the phosphorus element and/or a decrease of a content of the oxygen element in the lithium iron phosphate are measured.

Positive Electrode Plate

According to a second aspect of the present application, a positive electrode plate is provided, including a positive electrode film layer. The positive electrode film layer includes the positive electrode active material in any implementation.

Figure 4:
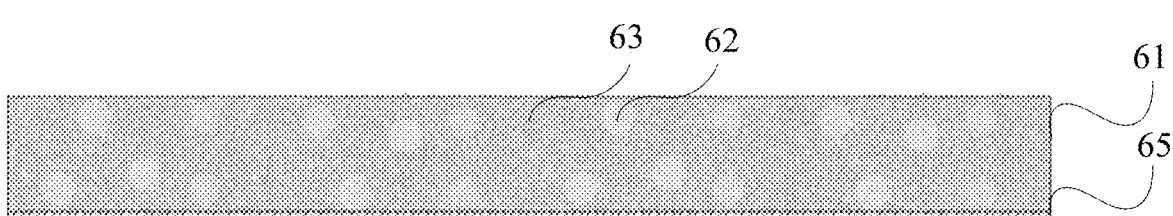
FIG. 4 is a schematic diagram of a structure of a positive electrode plate according to an implementation of the present application.

In some implementations, FIG. 4 is a schematic diagram of a structure of a positive electrode plate. A positive electrode plate 6 includes a positive electrode current collector 65 and a positive electrode film layer 61 disposed on at least one surface of the positive electrode current collector 65. The positive electrode film layer 61 includes a positive electrode active material, and the positive electrode active material includes secondary particles 62 and single-crystal or quasi-single-crystal particles 63.

The positive electrode plate has low costs and a high compaction density.

In an example, the positive electrode current collector has two opposite surfaces in a thickness direction of the positive electrode current collector, and the positive electrode film layer is disposed on either or both of the two opposite surfaces of the positive electrode current collector.

In some implementations, the positive electrode current collector may use a metal foil or a composite current collector. For example, as the metal foil, an aluminum foil may be used. The composite current collector may include a polymer material substrate and a metal layer formed on at least one surface of the polymer material substrate. The composite current collector may be formed by forming a metal material (aluminum, an aluminum alloy, nickel, a nickel alloy, titanium, a titanium alloy, silver, a silver alloy, or the like) on the polymer material substrate (for example, a substrate of polypropylene (PP), polyethylene terephthalate (PET), polybutylene terephthalate (PBT), polystyrene (PS), or polyethylene (PE)).

In some implementations, the positive electrode film layer optionally includes a binder. In an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some implementations, the positive electrode film layer optionally includes a conductive agent. In an example, the conductive agent may include at least one of superconducting carbon, acetylene black, carbon black, Ketjen black, carbon dots, carbon nanotubes, graphene, and carbon nanofibers.

In some implementations, the positive electrode plate may be prepared in the following manner: dispersing the foregoing components for preparing the positive electrode plate, for example, the positive electrode active material, the conductive agent, the binder, and any other components, in a solvent (for example N-methylpyrrolidone) to form a positive electrode slurry; and coating the positive electrode slurry on the positive electrode current collector, followed by processes such as drying and cold pressing, to obtain the positive electrode plate.

Negative Electrode Plate

The negative electrode plate includes a negative electrode current collector and a negative electrode film layer disposed on at least one surface of the negative electrode current collector. The negative electrode film layer including a negative electrode active material.

In an example, the negative electrode current collector has two opposite surfaces in a thickness direction of the negative electrode current collector, and the negative electrode film layer is disposed on either or both of the two opposite surfaces of the negative electrode current collector.

In some implementations, the negative electrode current collector may use a metal foil or a composite current collector. For example, as the metal foil, a copper foil may be used. The composite current collector may include a polymer material substrate and a metal layer formed on at least one surface of the polymer material substrate. The composite current collector may be formed by forming a metal material (copper, a copper alloy, nickel, a nickel alloy, titanium, a titanium alloy, silver, a silver alloy, or the like) on the polymer material substrate (for example, a substrate of polypropylene (PP), polyethylene terephthalate (PET), polybutylene terephthalate (PBT), polystyrene (PS), or polyethylene (PE)).

In some implementations, the negative electrode active material may be a negative electrode active material used for batteries well-known in the art. In an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, a silicon oxide, a silicon-carbon composite, a silicon-nitrogen composite, and a silicon alloy. The tin-based material may be selected from at least one of elemental tin, a tin oxide, and a tin alloy. However, the present application is not limited to such materials, and may alternatively use other conventional materials that can be used as negative electrode active materials for batteries. Only one or a combination of two or more of these negative electrode active materials may be used.

In some implementations, the negative electrode film layer optionally includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some implementations, the negative electrode film layer optionally includes a conductive agent. The conductive agent may be selected from at least one of superconducting carbon, acetylene black, carbon black, Ketjen black, carbon dots, carbon nanotubes, graphene, and carbon nanofibers.

In some implementations, the negative electrode film layer optionally includes another additive such as a thickener (for example, sodium carboxymethyl cellulose (CMC-Na)).

In some implementations, the negative electrode plate may be prepared in the following manner: dispersing the foregoing components for preparing the negative electrode plate, for example, the negative electrode active material, the conductive agent, the binder, and any other components, in a solvent (for example deionized water) to form a negative electrode slurry; and coating the negative electrode slurry on the negative electrode current collector, followed by processes such as drying and cold pressing, to obtain the negative electrode plate.

Electrolyte

The electrolyte serves to conduct ions between the positive electrode plate and the negative electrode plate. A type of the electrolyte is not specifically limited in the present application, and may be selected based on a requirement. For example, the electrolyte may be liquid, gelled, or all solid.

In some implementations, the electrolyte uses an electrolyte solution. The electrolyte solution includes electrolyte salt and a solvent.

In some implementations, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium triflate, lithium difluorophosphate, lithium difluoro(oxalato)borate, lithium bis(oxalate)borate, lithium difluorobis(oxalato) phosphate, and lithium tetrafluoro(oxalato)phosphate.

In some implementations, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some implementations, the electrolyte solution optionally includes an additive. For example, the additive may include a negative electrode film forming additive, a positive electrode film forming additive, and may further include an additive that can improve particular battery performance, for example, an additive that improves battery overcharging performance, or an additive that improves high-temperature or low-temperature performance of the battery.

Secondary Battery

According to a third aspect of the present application, a secondary battery is provided, including the positive electrode active material in any implementation and the positive electrode plate in any implementation.

The secondary battery has low costs and high cycle stability.

In some implementations, the secondary battery further includes a separator, and the separator includes at least one of a hydroxyl functional group, an amino functional group, a carboxyl functional group, and an ester functional group.

When the transition metal ions dissolved in the positive electrode active material diffuse from the positive electrode to the negative electrode, the separator can chelate or absorb the transition metal ions by using a functional group on a surface of the separator, to form a stable metal chelation or adsorptive, so that the transition metal ions are effectively prevented from migrating to the negative electrode, a damage caused by the transition metal ions to a solid electrolyte interface film (SEI film) on a surface of the negative electrode is reduced, and reduction of the transition metal ions to a metal elementary substance at the negative electrode is also effectively reduced, thereby helping improve a capacity retention rate of the secondary battery.

In some implementations, the separator includes a base layer and a functional coating located on at least one side of the base layer, and the functional coating includes an inorganic material. The inorganic material optionally includes at least one of aluminum oxide, silicon dioxide, magnesium oxide, calcium oxide, and titanium oxide. A surface of the inorganic material includes at least one of —OH, —NH$_2$, and —COOH.

In some implementations, a material of the base layer of the separator may be selected from at least one of glass fiber, non-woven cloth, polyethylene, polypropylene, and polyvinylidene fluoride.

In some implementations, an electrode assembly may be manufactured by using the positive electrode plate, the negative electrode plate, and the separator through a winding process or a laminating process.

In some implementations, the secondary battery may include an outer packaging. The outer packaging may be used to encapsulate the foregoing electrode assembly and electrolyte.

In some embodiments, the outer packaging of the secondary battery may be a hard case, such as a hard plastic case, an aluminum case, or a steel case. The outer packaging of the secondary battery may alternatively be a soft package such as a pouch-type soft package. A material of the soft package may be plastic, and examples of the plastic may include polypropylene, polybutylene terephthalate, and polybutylene succinate.

Figure 5:
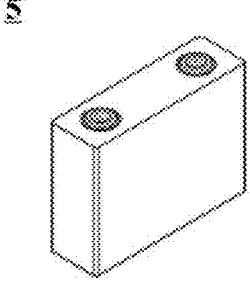
FIG. 5 is a schematic diagram of a secondary battery according to an implementation of the present application.

A shape of the secondary battery is not particularly limited in the present application, and the secondary battery may be cylindrical, prismatic, or of any other shape. For example, FIG. 5 shows a secondary battery 5 having a rectangle structure as an example.

Figures 6, 7:
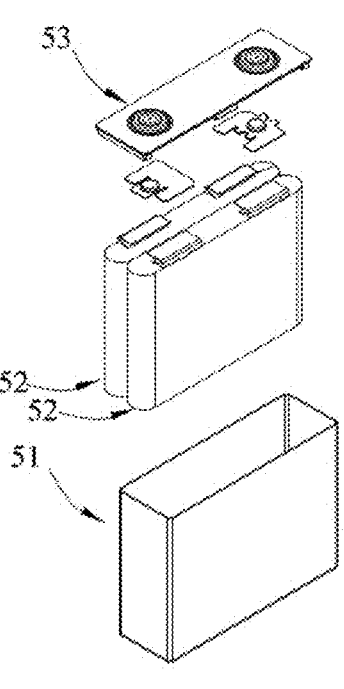
FIG. 6 is an exploded view of the secondary battery according to the implementation of the present application shown in FIG. 5.
FIG. 7 is a schematic diagram of a power consuming apparatus according to an implementation of the present application.

In some implementations, referring to FIG. 6, the outer packaging may include a housing 51 and a cover plate 53. The housing 51 may include a bottom plate and a side plate connected to the bottom plate. The bottom plate and the side plate enclose an accommodating cavity. The housing 51 is provided with an opening in communication with the accommodating cavity, and the cover plate 53 is used for covering the opening to close the accommodating cavity. An electrode assembly 52 may be formed by using the positive electrode plate, the negative electrode plate, and the separator through a winding process or a laminating process. The electrode assembly 52 is encapsulated within the accommodating cavity. The electrolyte solution infiltrates into the electrode assembly 52. A quantity of electrode assemblies 52 included in the secondary battery 5 may be one or more, and may be selected by those skilled in the art based on specific actual requirements.

Power Consuming Apparatus

According to a fourth aspect of the present application, a power consuming apparatus is provided, including the secondary battery in any implementation.

The power consuming apparatus may include, but is not limited to, a mobile device (for example, a mobile phone, or a notebook computer), an electric vehicle (for example, a pure electric vehicle, a hybrid electric vehicle, a plug-in hybrid electric vehicle, an electric bicycle, an electric scooter, an electric golf cart, or an electric truck), an electric train, a ship and a satellite, an energy storage system, or the like.

The power consuming apparatus can select a secondary battery, a battery module, or a battery pack based on a use requirement of the power consuming apparatus.

FIG. 7 shows a power consuming apparatus as an example. The power consuming apparatus is a pure electric vehicle, a hybrid electric vehicle, a plug-in hybrid electric vehicle, or the like. To satisfy requirements of the power consuming apparatus for high power and a high energy density of a secondary battery, a battery pack or a battery module may be used.

For another example, the apparatus may be a mobile phone, a tablet computer, or a notebook computer. The apparatus is generally required to be thin and light, and may have a secondary battery used as a power supply.

EXAMPLE

The examples of the present application are described below. The examples described below are exemplary and only used to explain the present application, and should not be construed as a limitation on the present application. When specific technologies or conditions are not indicated in the examples, the examples are carried out according to technologies or conditions described in the literature in the art or according to the product specifications. The used reagents or instruments without manufacturer indicated are all conventional products that may be purchased in the market.

I. Preparation Method

Example 1

(1) Preparation of a Positive Electrode Active Material

Preparation Method of Secondary Particles

A mixed carbon source of lithium carbonate, iron(III) oxide, ammonium dihydrogen phosphate, glucose, and polyethylene glycol (PEG) was dispersed and mixed in water, to obtain a mixed material. A molar ratio of Li:Fe:P in a slurry after the mixing was (1.01-1.03):(0.99-0.96):1, a solid content of the slurry after the mixing was 45%, a weight ratio of the glucose to the PEG was 2:1, and a molecular mass of the PEG was 6000.

The iron(III) oxide includes impurities of Ni, Cr, Cu, Zn, Co, and Mn, and a total content of the iron(III) oxide is 3500 ppm relative to a mass of a raw material of the iron(III) oxide. The ammonium dihydrogen phosphate includes impurities of Na, K, Ca, Al, and Mg, and a total content of the ammonium dihydrogen phosphate is 1000 ppm relative to a mass of a raw material of the ammonium dihydrogen phosphate. The mixed material was grinded to obtain a mixed material slurry. Spray drying and granulation were performed on the mixed material slurry, to obtain a precursor. Pre-burning was performed on the precursor in oxygen gas, to obtain a pre-burned product. Sintering was performed on the pre-burned product under a protective atmosphere of nitrogen gas, where a constant sintering temperature was 740° C., and constant temperature duration was 8 h, to obtain a polycrystalline particle lithium iron phosphate material. Demagnetization and sieving were performed on the material, to obtain a lithium iron phosphate material whose secondary particle size was 6 μm.

Preparation Method of Single-Crystal or Quasi-Single-Crystal Particles

A mixed carbon source of lithium carbonate, iron(III) oxide, ammonium dihydrogen phosphate, glucose, and PEG was dispersed and mixed in water, to obtain a mixed slurry. A molar ratio of Li:Fe:P in the slurry after the mixing was (1.01-1.03):(0.99-0.96):1, and a solid content of the mixed slurry was 45%. The iron(III) oxide includes impurities of Ni, Cr, Cu, Zn, Co, and Mn, and a total content of the iron(III) oxide is 100 ppm relative to a mass of a raw material of the iron(III) oxide. The ammonium dihydrogen phosphate includes impurities of Na, K, Ca, Al, and Mg, and a total content of the ammonium dihydrogen phosphate is 100 ppm relative to a mass of a raw material of the ammonium dihydrogen phosphate.

The mixed slurry was grinded to obtain a mixed material. Spray drying and granulation were performed on the mixed material, to obtain a precursor. Pre-burning was performed on the precursor in oxygen gas, to obtain a pre-burned product. Sintering was performed on the pre-burned product under a protective atmosphere of nitrogen gas, where a constant sintering temperature was 780° C., and sintering duration was 8 h, to obtain a sintered product. The sintered product was crushed to obtain a single-crystal or quasi-single-crystal particle lithium iron phosphate material.

The secondary particles and the single-crystal or quasi-single-crystal particles were mixed according to a ratio to prepare the positive electrode active material.

(2) Preparation of a Positive Electrode Plate

The positive electrode active material occupying 97 wt % of a solid mass of a positive electrode slurry, a conductive agent conductive carbon black occupying 1 wt %, and a binder polyvinylidene fluoride occupying 2 wt % were mixed, then N-methylpyrrolidone was added, and stirring was performed, to obtain the positive electrode slurry through dispersion. Then, the positive electrode slurry was coated on an aluminum foil. After the foregoing steps were completed, drying, cold pressing, and dividing were performed, to prepare the positive electrode plate.

(3) Preparation of a Negative Electrode Plate

A negative electrode active material artificial graphite of 95 wt %, a conductive agent conductive carbon black of 1.0 wt %, a binder styrene-butadiene rubber (SBR) of 2.0 wt %, and a thickener sodium carboxymethyl cellulose (CMC-Na) of 2.0 wt % were mixed, deionized water was added, and stirring was performed, to prepare a negative electrode slurry through dispersion.

Then, the negative electrode slurry was coated on a CU foil. After the negative electrode slurry was coated on both surfaces, drying, cold pressing, dividing, and plate production were performed, to prepare the negative electrode plate.

(4) Preparation of an Electrolyte Solution.

In a glove box (where $H_2O<0.1$ ppm, and $O_2<0.1$ ppm) in an atmosphere of argon gas, organic solvents ethylene carbonate (EC)/ethyl methyl carbonate (EMC) were uniformly mixed according to a volume ratio of 3/7, $LiPF_6$ lithium salt of 12.5% (where a mass percentage of the $LiPF_6$ lithium salt in the electrolyte solution was 12.5%) was added and dissolved in the organic solvents, and stirring was uniformly performed, to obtain the electrolyte solution.

(5) Preparation of a Separator

A polyethylene film (PE separator) was used as the separator.

(6) Preparation of a Battery

The positive electrode plate, the separator, and the negative electrode plate were stacked in sequence, to enable the separator to be located between a positive electrode and a negative electrode for separation, and then winding and hot pressing were performed, to obtain a bare battery cell. The bare battery cell was disposed in an outer packaging, the prepared electrolyte solution was injected, and processes such as encapsulation, liquid injection, formation, and venting were performed, to obtain a lithium-ion battery.

In Examples 2 to 13, contents of impurity elements are adjusted. A content of a transition metal oxide impurity in an iron source is adjusted, to adjust contents of an M1 element and an Ma element in the positive electrode active material. A content of an alkali metal impurity and a content of an alkaline earth metal oxide impurity in a lithium source and a phosphorus source are adjusted, to adjust contents of an M2 element and an Mb element in the positive electrode active material.

In Examples 14 to 19, particle sizes of the secondary particles and the primary particles are adjusted. An adjustment methods are as follows:

The particle size of the secondary particles was controlled by adjusting a parameter of a spraying system during the spray drying, for example, a spraying pressure, a spraying flow rate, and a solid content of a spraying slurry. The particle size of the primary particles was adjusted by adjusting a sintering temperature and sintering duration.

In Examples 20 to 22, a mass ratio of the secondary particles to the single-crystal or quasi-single-crystal particles is adjusted. Specific parameters are shown in a table.

A preparation method in Example 23 is basically the same as that in Example 1, and a difference lies in that the separator is a modified separator. A preparation method of the separator includes the following steps.

Silicon dioxide particles was mixed and sonicated with anhydrous toluene and γ-aminopropyl triethoxysilane until there is no agglomeration phenomenon. Subsequently, reflow cleaning was performed to remove a redundant silylation reagent, so as to obtain a silicon dioxide microsphere with an amine-functionalized surface.

The silicon dioxide microsphere with the amine-functionalized surface and a binder PVDF were mixed for two hours in an organic solvent (NMP) according to a mass ratio of 20:80, and a viscosity was adjusted to range from 100 mPa·s to 500 mPa·s, to prepare a coating slurry.

The coating slurry was coated on two surfaces of a porous substrate PE through spraying, and water rinse and drying were performed, to obtain the modified separator.

Preparation methods in Comparative example 1 and Comparative example 3 are basically the same as that in Example 1, and a difference lies in that only the secondary particles are included in Comparative example 1 and Comparative example 3, and the single-crystal or quasi-single-crystal particles are not included.

Preparation methods in Comparative example 2 and Comparative example 4 are basically the same as that in Example 1, and a difference lies in that the contents of the M1 element and the Ma element in the positive electrode active material are respectively adjusted by adjusting the content of the transition metal oxide impurity in the iron source in Comparative example 2 and Comparative example 4.

II. Performance Test

1. Testing of the Average Particle Sizes of the Secondary Particles and the Single-Crystal or Quasi-Single-Crystal Particles.

A cross section of a positive electrode plate is observed by using a scanning electron microscope, observing is performed by using the scanning electron microscope, particle size area analysis is performed on an obtained scanning electron microscope diagram of the cross section of the electrode plate by using Avizo 3D software, a particle size of the positive electrode active material is obtained through fitting calculation, a total value of collected particle sizes of the secondary particles is divided by a total quantity of the secondary particles as the average particle size of the secondary particles, and a total value of collected particle sizes of the single-crystal or quasi-single-crystal particles is divided by a total quantity of the single-crystal or quasi-single-crystal particles as the average particle size of the single-crystal or quasi-single-crystal particles.

2. Test of the Particle Size of the Primary Particles

A cross section of the secondary particles is observed by using a scanning electron microscope, to observe a particle morphology of the secondary particles, and a particle size of the primary particles inside the secondary particles is measured. A long diameter of the primary particles is used as the particle size of the primary particles, and a total value of particle sizes of the primary particles is divided by a total quantity of the primary particles as the average particle size of the primary particles.

3. Measurement of the Elements in the Secondary Particles and the Single-Crystal or Quasi-Single-Crystal Particles and the Contents of the Elements.

The contents of the elements are tested with reference to a chemical analysis method for nanometer lithium iron phosphate in the national standard GB T33822-2017.

4. Method for Testing a Gram Capacity

A capacity of a battery is represented by using a gram capacity of ⅓ C at 25° C. A specific detection procedure is briefly described as follows: The battery was disposed in an oven environment of 25° C., and was statically disposed for 2 h until a temperature of the battery was maintained at 25° C. The battery was charged by using a direct current of ⅓ C until a voltage was 2.0 V. A pause of 5 min was provided. The battery was charged by using a constant current of ⅓ C until the voltage was 3.65 V, and was charged at a constant voltage until a current was less than or equal to 0.05 C. A pause of 5 min was provided. The battery was discharged at a constant voltage of ⅓ C until the voltage was 2.0 V. An actual test capacity of a battery core was obtained in this step, and the gram capacity can be calculated with reference to the mass of the positive electrode active material.

5. Method for Testing Low-Temperature Performance

After each of the lithium ion batteries prepared in Examples and Comparative examples was preserved for 2 h at 25° C., the battery was charged to 3.65 V by using a constant current with a rate of 0.33 C, and was charged to 0.05 C at a constant voltage of 3.65 V. After charging was completed, the tested battery was statically disposed for 2 h at 25° C., and was discharged to 2.5 V by using a direct current with a rate of 0.5 C. A discharging capacity of the battery at a normal temperature was recorded as CO.

After each of the lithium ion batteries prepared in Examples and Comparative examples was preserved for 2 h at 25° C., the battery was charged to 3.65 V by using a constant current with a rate of 0.33 C, and was charged to 0.05 C at a constant voltage of 3.65 V. After charging was completed, the tested battery was statically disposed for 2 h at −20° C., and was discharged to 2.5 V by using a direct current with a rate of 0.5 C. A discharging capacity of the battery at −20° C. was recorded as C1. A capacity retention rate of the lithium ion battery at −20° C. is (C1/C0) ×100%.

6. Method for Testing Cycle Performance

Circulation of 1C/1C is performed at 60° C., to detect a quantity of cycles when a capacity of the battery is attenuated to 80% of an initial value. A specific procedure is briefly described as follows: The battery was disposed on an oven of 25° C., and was statically disposed for 2 h until a temperature of the battery was maintained at 25° C. The battery was charged to 3.65 V by using a constant current of 1 C, and continued to be charged by using the constant current until the charging current is less than 0.05 C. The battery was statically disposed for 5 min. The battery was discharged to 2.5 V by using a constant current of 1 C. A pause of 5 min was provided. This is a charging/discharging cycle. The foregoing steps were continuously repeated, and the quantity of cycles when the capacity of the battery is attenuated to 80% of the initial value was measured.

7. Method for Testing a Self-Discharging K Value.

The battery was disposed in an oven of 25° C., and was statically disposed for 30 min. The battery was charged to 3.65 V by using a constant current of ⅓ C, and continued to be charged by using the constant current until the charging current is less than 0.05 C. The battery was statically disposed for 30 min. The battery was discharged to 2.0 V by using a constant current of 0.1 C. The battery was statically disposed for 30 min. The battery was charged to 21% SOC by using a constant current of 0.1 C. The battery was statically disposed for 30 min. The battery was statically disposed for 12 h. A voltage was tested, and was recorded as OCV1, where a unit was mV. The battery was statically disposed for 24 h. A voltage was tested, and was recorded as OCV2, where a unit was mV. The K value=(OCV1−OCV2)/24 h, where a unit was m V/h.

22

III. Analysis of Test Results of Examples and Comparative Examples

The batteries in Examples and Comparative examples are respectively prepared according to the foregoing methods, and performance parameters are measured. For results, refer to Table 1 to Table 3 below.

TABLE 1

| | | Secondary particles | | | | Single-crystal or quasi-single-crystal particles | | |
| | | | | | | Ma | | |
| Serial number | Mass ratio of secondary particles to single-crystal particles | M1 (Ni, Cr, Cu, Zn, Co, and Mn) Mass content X1/ppm | M2 (Na, K, Ca, Al, and Mg) Mass content/ppm | Average particle size r (μm) of the secondary particles | Average particle size R1 (nm) of primary particles | element (Ni, Cr, Cu, Zn, Co, and Mn) Mass content X2/ppm | Mb element (Na, K, Ca, AL, and Mg) Mass content/ppm | Average particle size R2 (nm) of the single-crystal particles |
|---|---|---|---|---|---|---|---|---|
| Example 1 | 3:7 | 2000 | 1000 | 6 | 100 | 100 | 100 | 600 |
| Example 2 | 3:7 | 500 | 1000 | 6 | 100 | 100 | 100 | 600 |
| Example 3 | 3:7 | 5000 | 1000 | 6 | 100 | 100 | 100 | 600 |
| Example 4 | 3:7 | 800 | 1000 | 6 | 100 | 100 | 100 | 600 |
| Example 5 | 3:7 | 2000 | 1000 | 6 | 100 | 20 | 100 | 600 |
| Example 6 | 3:7 | 2000 | 1000 | 6 | 100 | 450 | 100 | 600 |
| Example 7 | 3:7 | 2000 | 1000 | 6 | 100 | 300 | 100 | 600 |
| Example 8 | 3:7 | 2000 | 8000 | 6 | 100 | 100 | 100 | 600 |
| Example 9 | 3:7 | 2000 | 5000 | 6 | 100 | 100 | 100 | 600 |
| Example 10 | 3:7 | 2000 | 650 | 6 | 100 | 100 | 100 | 600 |
| Example 11 | 3:7 | 2000 | 1000 | 6 | 100 | 100 | 20 | 600 |
| Example 12 | 3:7 | 2000 | 1000 | 6 | 100 | 100 | 550 | 600 |
| Example 13 | 3:7 | 2000 | 1000 | 6 | 100 | 100 | 300 | 600 |
| Example 14 | 3:7 | 2000 | 1000 | 1.2 | 100 | 100 | 100 | 600 |
| Example 15 | 3:7 | 2000 | 1000 | 18 | 100 | 100 | 100 | 600 |
| Example 16 | 3:7 | 2000 | 1000 | 2.4 | 100 | 100 | 100 | 600 |
| Example 17 | 3:7 | 2000 | 1000 | 6 | 60 | 100 | 100 | 600 |
| Example 18 | 3:7 | 2000 | 1000 | 6 | 30 | 100 | 100 | 600 |
| Example 19 | 3:7 | 2000 | 1000 | 6 | 300 | 100 | 100 | 600 |
| Example 20 | 1:9 | 2000 | 1000 | 6 | 100 | 100 | 100 | 600 |
| Example 21 | 4:6 | 2000 | 1000 | 6 | 100 | 100 | 100 | 600 |
| Example 22 | 2:8 | 2000 | 1000 | 6 | 100 | 100 | 100 | 600 |
| Example 23 | 3:7 | 2000 | 1000 | 6 | 100 | 100 | 100 | 600 |
| Comparative example 1 | 10:0 | 2000 | 1000 | 6 | 100 | / | / | / |

TABLE 1-continued

| | | | | | | | | |
|---|---|---|---|---|---|---|---|---|
| Comparative example 2 | 3:7 | 8000 | 1000 | 6 | 100 | 100 | 100 | 600 |
| Comparative example 3 | 10:0 | 2000 | 50 | 6 | 100 | / | / | / |
| Comparative example 4 | 3:7 | 2000 | 1000 | 6 | 100 | 2000 | 100 | 600 |

| Serial number | r/R2 | R2/r1 | Separator | Quantity of cycles/ circle | Compaction density mg/cm³ | Self-discharging K value (mV/h) |
|---|---|---|---|---|---|---|
| Example 1 | 10 | 6 | Base film | 1050 | 2.5 | 0.022 |
| Example 2 | 10 | 6 | Base film | 1060 | 2.5 | 0.018 |
| Example 3 | 10 | 6 | Base film | 1005 | 2.5 | 0.042 |
| Example 4 | 10 | 6 | Base film | 1040 | 2.5 | 0.026 |
| Example 5 | 10 | 6 | Base film | 1080 | 2.5 | 0.018 |
| Example 6 | 10 | 6 | Base film | 1005 | 2.5 | 0.031 |
| Example 7 | 10 | 6 | Base film | 1030 | 2.5 | 0.028 |
| Example 8 | 10 | 6 | Base film | 980 | 2.5 | 0.023 |
| Example 9 | 10 | 6 | Base film | 1000 | 2.5 | 0.023 |
| Example 10 | 10 | 6 | Base film | 1055 | 2.5 | 0.022 |
| Example 11 | 10 | 6 | Base film | 1080 | 2.5 | 0.021 |
| Example 12 | 10 | 6 | Base film | 890 | 2.5 | 0.022 |
| Example 13 | 10 | 6 | Base film | 990 | 2.5 | 0.022 |
| Example 14 | 2 | 6 | Base film | 950 | 2.39 | 0.022 |
| Example 15 | 30 | 6 | Base film | 890 | 2.35 | 0.032 |
| Example 16 | 4 | 6 | Base film | 1010 | 2.42 | 0.022 |
| Example 17 | 10 | 10 | Base film | 900 | 2.38 | 0.025 |
| Example 18 | 10 | 20 | Base film | 840 | 2.32 | 0.028 |
| Example 19 | 10 | 2 | Base film | 1150 | 2.42 | 0.022 |
| Example 20 | 10 | 6 | Base film | 1120 | 2.51 | 0.022 |
| Example 21 | 10 | 6 | Base film | 950 | 2.43 | 0.039 |
| Example 22 | 10 | 6 | Base film | 1080 | 2.52 | 0.023 |
| Example 23 | 10 | 6 | Modified | 1115 | 2.5 | 0.016 |
| Comparative example 1 | / | / | Base film | 700 | 2.15 | 0.06 |
| Comparative example 2 | 10 | 6 | Base film | 920 | 2.5 | 0.048 |
| Comparative example 3 | / | / | Base film | 690 | 2.15 | 0.06 |

TABLE 1-continued

| | | | | | | |
|---|---|---|---|---|---|---|
| Comparative example 4 | 10 | 6 | Base film | 890 | 2.5 | 0.07 |

TABLE 2

| Serial number | Mass ratio of secondary particles to single-crystal particles | Secondary particles | | | | Single-crystal particles | | | Gram capacity (mAh/g) |
|---|---|---|---|---|---|---|---|---|---|
| | | Mass content of M1/ppm | Mass content of M2/ppm | Average particle size r (μm) of the secondary particles | Average particle size R1 (nm) of primary particles | Mass content of Ma/ppm | Mass content of Mb/ppm | Average particle size R2 (nm) of the single-crystal particles | |
| Example 1 | 3:7 | 2000 | 1000 | 6 | 100 | 100 | 100 | 600 | 156 |
| Example 8 | 3:7 | 2000 | 8000 | 6 | 100 | 100 | 100 | 600 | 154 |
| Example 9 | 3:7 | 2000 | 5000 | 6 | 100 | 100 | 100 | 600 | 155 |
| Example 10 | 3:7 | 2000 | 650 | 6 | 100 | 100 | 100 | 600 | 156 |
| Example 11 | 3:7 | 2000 | 1000 | 6 | 100 | 100 | 20 | 600 | 156 |
| Example 12 | 3:7 | 2000 | 1000 | 6 | 100 | 100 | 550 | 600 | 154 |
| Example 13 | 3:7 | 2000 | 1000 | 6 | 100 | 100 | 300 | 600 | 155 |

TABLE 3

| Serial number | Mass ratio of secondary particles to single-crystal particles | Secondary particles | | | | Primary particles | | | Low-temperature capacity retention rate | Quantity of cycles/circle |
|---|---|---|---|---|---|---|---|---|---|---|
| | | Mass content of M1/ppm | Mass content of M2/ppm | Average particle size r (μm) of the secondary particles | Average particle size R1 (nm) of the primary particles | Mass content of Ma/ppm | Mass content of Mb/ppm | Average particle size R2 (nm) of the single-crystal particles | | |
| Example 1 | 3:7 | 2000 | 1000 | 6 | 100 | 100 | 100 | 600 | 78% | 1050 |
| Example 17 | 3:7 | 2000 | 1000 | 6 | 60 | 100 | 100 | 600 | 78% | 900 |
| Example 18 | 3:7 | 2000 | 1000 | 6 | 30 | 100 | 100 | 600 | 79% | 840 |
| Example 19 | 3:7 | 2000 | 1000 | 6 | 300 | 100 | 100 | 600 | 65% | 1150 |

It can be learned from comparison between Examples and Comparative examples that the positive electrode active material in this embodiment of the present application includes the secondary particles and the single-crystal or quasi-single-crystal particles. The secondary particles are mainly formed by aggregating the primary particles and the secondary particles further include the M1 element. The M1 element includes elements of Ni, Cr, Cu, Zn, Co, and Mn. The mass content X1 of the M1 element ranges from 500 ppm to 5000 ppm, and optionally, ranges from 800 ppm to 2000 ppm, based on the total mass of the secondary particles. The single-crystal or quasi-single-crystal particles include the Ma element. The Ma element includes the transition metal element other than iron. The mass content of the Ma element is X2 based on the total mass of the single-crystal or quasi-single-crystal particles, where X2 is less than X1. The positive electrode active material can achieve a balance between low costs and electrochemical performance of the secondary battery.

It can be learned from comparison between Examples and Comparative examples in Table 1 that the single-crystal particles include the Ma element (Ni, Cr, Cu, Zn, Co, and Mn). When the mass content X2 of the Ma element ranges from 20 ppm to 450 ppm based on a total mass of the single-crystal particles, the secondary battery has a low self-discharging level.

It can be learned from Examples 5 to 7 that the single-crystal particles include the Ma element (Ni, Cr, Cu, Zn, Co, Mn, and V). When the mass content X2 of the Ma element ranges from 100 ppm to 300 ppm based on the total mass of the single-crystal particles, the secondary battery has both low costs and a low self-discharging level.

The secondary particles further include the M2 element (Na, K, Ca, AL, and Mg). When the mass content of the M2 element ranges from 650 ppm to 8000 ppm based on the total mass of the secondary particles, costs of the secondary battery are further reduced.

It can be learned from Examples 11 to 13 that the single-crystal or quasi-single-crystal particles include the Mb element (Na, K, Ca, Al, and Mg). When the mass content of the Mb element ranges from 20 ppm to 550 ppm based on the total mass of the single-crystal particles, the secondary battery has a large capacity.

It can be learned from Examples 1 and 11 to 13 that the single-crystal particles include the Mb element (Na, K, Ca, Al, and Mg). When the mass content of the Mb element ranges from 100 ppm to 300 ppm based on the total mass of the single-crystal particles, the secondary battery has both low costs and a large capacity.

It can be learned from comparison between Examples and Comparative examples that, when the average particle size of the secondary particles is r, the average particle size of the single-crystal particles is R2, and 25r/R2≤30, the secondary battery has high cycle stability and a high compaction density.

It can be learned from Examples 14 to 16 and Example 1 that, when the average particle size of the secondary particles is r, the average particle size of the single-crystal particles is R2, and 4≤r/R2≤10, the cycle stability and the compaction density of the secondary battery are further improved.

It can be learned from comparison between Examples and Comparative examples that, when the average particle size of the primary particles is R1, the average particle size of the single-crystal particles is R2, and 2R2/R1≤20, the secondary battery has good low-temperature performance.

It can be learned from Examples 17 to 19 and Example 1 that, when the average particle size of the primary particles is R1, the average particle size of the single-crystal particles is R2, and 6≤R2/R1≤10, the secondary battery has both good low-temperature performance and cycle stability.

It can be learned from comparison between Examples and Comparative examples that, when the mass ratio of the secondary particles to the single-crystal particles ranges from 1:9 to 4:6, the battery has both low costs and high performance.

It can be learned from Examples 20 to 22 and Example 1 that, when the mass ratio of the secondary particles to the single-crystal particles ranges from 2:8 to 3:7, the costs and the performances of the battery are further balanced.

It can be learned from Example 23 and Example 1 that, when the modified separator is used in the secondary battery, the cycle stability of the battery is further improved, and the self-discharging K value of the battery is further reduced.

It should be noted that the present application is not limited to the foregoing embodiments. The foregoing embodiments are merely examples, and embodiments having substantially the same technical idea and the same effects within the scope of the technical solutions of the present application are all included in the technical scope of the present application. In addition, other embodiments constructed by applying various modifications conceivable to those skilled in the art to the embodiments and combining some of the constituent elements of the embodiments without departing from the scope of the essence of the present application are also included in the scope of the present application.

What is claimed is:

1. A positive electrode active material, wherein the positive electrode active material comprises:
   (i) secondary particles, wherein the secondary particles are mainly formed by aggregating primary particles, and the secondary particles further comprise an Ml element, the M1 element comprises a transition metal element other than iron, and a mass content of the M1 element is X1 based on a total mass of the secondary particles, wherein 500 ppm X1≤5000 ppm; and
   (ii) single-crystal or quasi-single-crystal particles, wherein the single-crystal or quasi-single- crystal particles comprise an Ma element, the Ma element comprises a transition metal element other than iron, and a mass content of the Ma element is X2 based on a total mass of the single- crystal or quasi-single-crystal particles, wherein X2 is less than X1.

2. The positive electrode active material according to claim 1, wherein the single-crystal or quasi-single-crystal particles comprise the Ma element, the Ma element comprises the transition metal element other than iron, and the mass content X2 of the Ma element ranges from 20 ppm to 450 ppm, based on the total mass of the single-crystal or quasi-single-crystal particles.

3. The positive electrode active material according to claim 1, wherein the secondary particles further comprise an M2 element, the M2 element comprises at least one of an alkali metal element other than a lithium element, an alkaline earth metal element, and a boron group element, and a mass content of the M2 element ranges from 650 ppm to 8000 ppm, based on the total mass of the secondary particles.

4. The positive electrode active material according to claim 3, wherein the M2 element and a Mb element each independently comprise at least one of Na, K, Ca, Al, and Mg, and the Ml element and the Ma element each independently comprise at least one of Ni, Cu, Zn, Mn, Cr, and Co.

5. The positive electrode active material according to claim 1, wherein the single-crystal or quasi-single-crystal particles further comprise an Mb element, the Mb element comprises at least one of an alkali metal element other than a lithium element, an alkaline earth metal element, and a boron group element, and a mass content of the Mb element ranges from 20 ppm to 550 ppm, based on the total mass of the single-crystal or quasi-single-crystal particles.

6. The positive electrode active material according to claim 1, wherein an average particle size of the primary particles is r, an average particle size of the single-crystal or quasi-single-crystal particles is R2, and 2≤r2/R2≤30.

7. The positive electrode active material according to claim 1, wherein the average particle size r of the secondary particles ranges from 1.2 μm to 18 μm.

8. The positive electrode active material according to claim 1, wherein an average particle size of the primary particles is R1, the average particle size of the single- crystal or quasi-single-crystal particles is R2, and 2≤R2/R1≤20, and optionally.

9. The positive electrode active material according to claim 1, wherein the average particle size R1 of the primary particles ranges from 30 nm to 300 nm.

10. The positive electrode active material according to claim 1, wherein a mass ratio of the secondary particles to the single-crystal or quasi-single-crystal particles ranges from 1:9 to 4:6.

11. The positive electrode active material according to claim 1, wherein the positive electrode active material comprises lithium-containing phosphate.

12. A positive electrode plate, comprising a positive electrode film layer, wherein the positive electrode film layer comprises the positive electrode active material according to claim 1.

13. A secondary battery, comprising the positive electrode active material according to claim 1.

14. The secondary battery according to claim 13, wherein the secondary battery further comprises a separator, and the separator comprises at least one of a hydroxyl functional group, an amino functional group, a carboxyl functional group, and an ester functional group.

15. The secondary battery according to claim 13, wherein the separator comprises a base layer and a functional coating located on at least one side of the base layer, and the functional coating comprises an inorganic material.

16. The secondary battery according to claim 15, wherein the inorganic material comprises at least one of aluminum oxide, silicon dioxide, magnesium oxide, calcium oxide, and titanium oxide, and a surface of the inorganic material comprises at least one of —OH, —$NH_2$, and —COOH.

17. A power consuming apparatus, comprising the secondary battery according to claim 13.

\* \* \* \* \*